United States Patent [19]

Smoluk

[11] Patent Number: 4,912,870
[45] Date of Patent: Apr. 3, 1990

[54] ICE FISHING APPARATUS WITH SELF HOOK SETTING MEANS

[76] Inventor: Vincent R. Smoluk, 2690 Garcia Street, Merritt, British Columbia, Canada

[21] Appl. No.: 197,928

[22] Filed: May 24, 1988

[51] Int. Cl.⁴ .............................................. A01K 97/01
[52] U.S. Cl. .......................................... 43/15; 43/21.2
[58] Field of Search ...................... 43/15, 21.2, 81, 82, 43/92

[56] References Cited

U.S. PATENT DOCUMENTS

| | | | |
|---|---|---|---|
| 1,996,704 | 4/1935 | Hawkinson | 43/15 |
| 2,216,529 | 10/1940 | Brzykky | 43/81 |
| 4,321,767 | 2/1982 | Hodshire | 43/15 |
| 4,586,283 | 5/1986 | Vocal | 43/15 |

Primary Examiner—Nicholas P. Godici
Assistant Examiner—Michael William Starkweather
Attorney, Agent, or Firm—Townsend and Townsend

[57] ABSTRACT

An apparatus to strike a fishing line. The apparatus has a base. A reel for a fishing line can be mounted on the base. There are guides on the base for a fishing line. The apparatus includes a device to impart a rapid upward motion to the line. Then releasing the line by the use of a spiral design on the frame, such that secondary control of the line is maintained by the use of preset drag on the reel.

8 Claims, 2 Drawing Sheets

U.S. Patent Apr. 3, 1990 Sheet 1 of 2 4,912,870
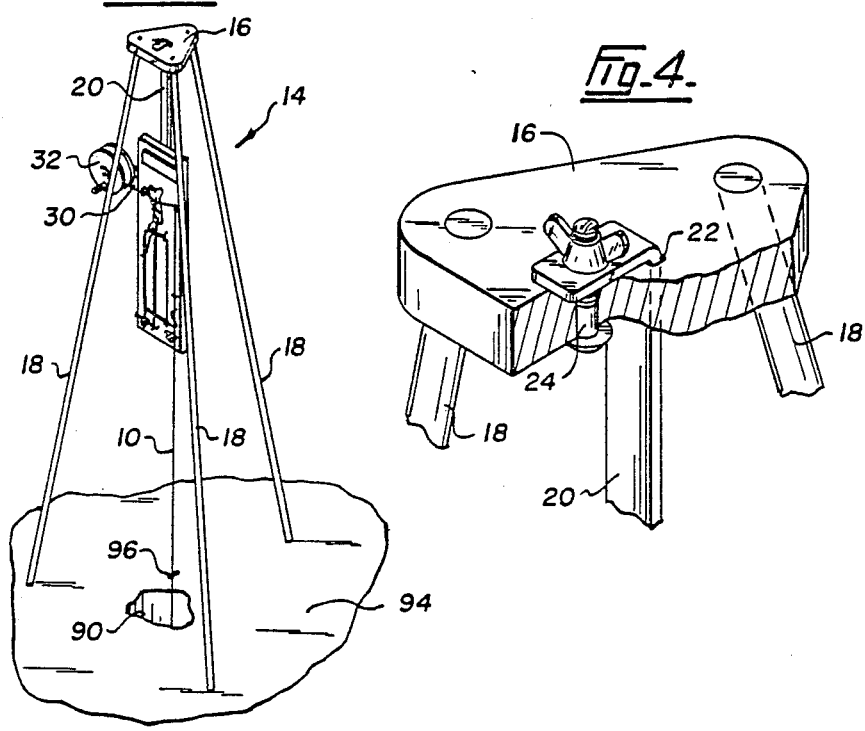
Fig. 1.
Fig. 4.
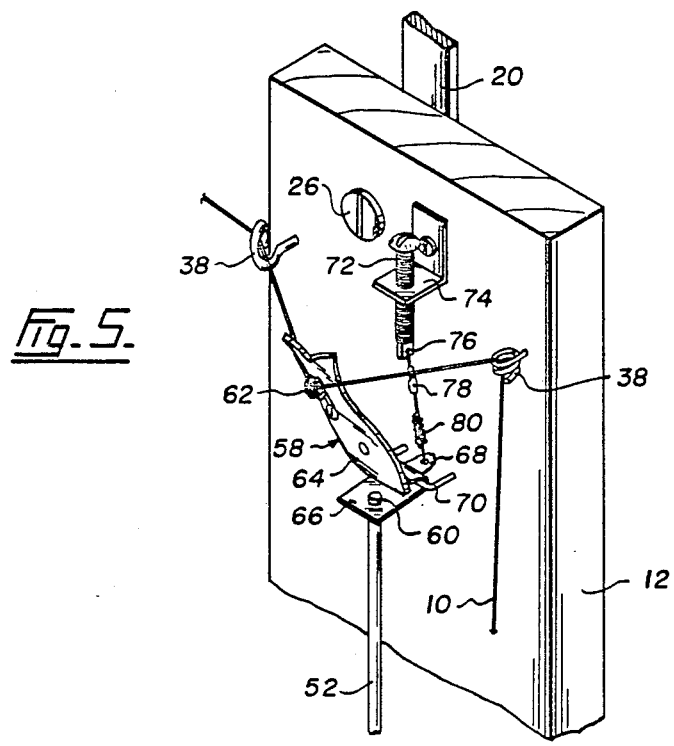
Fig. 5.

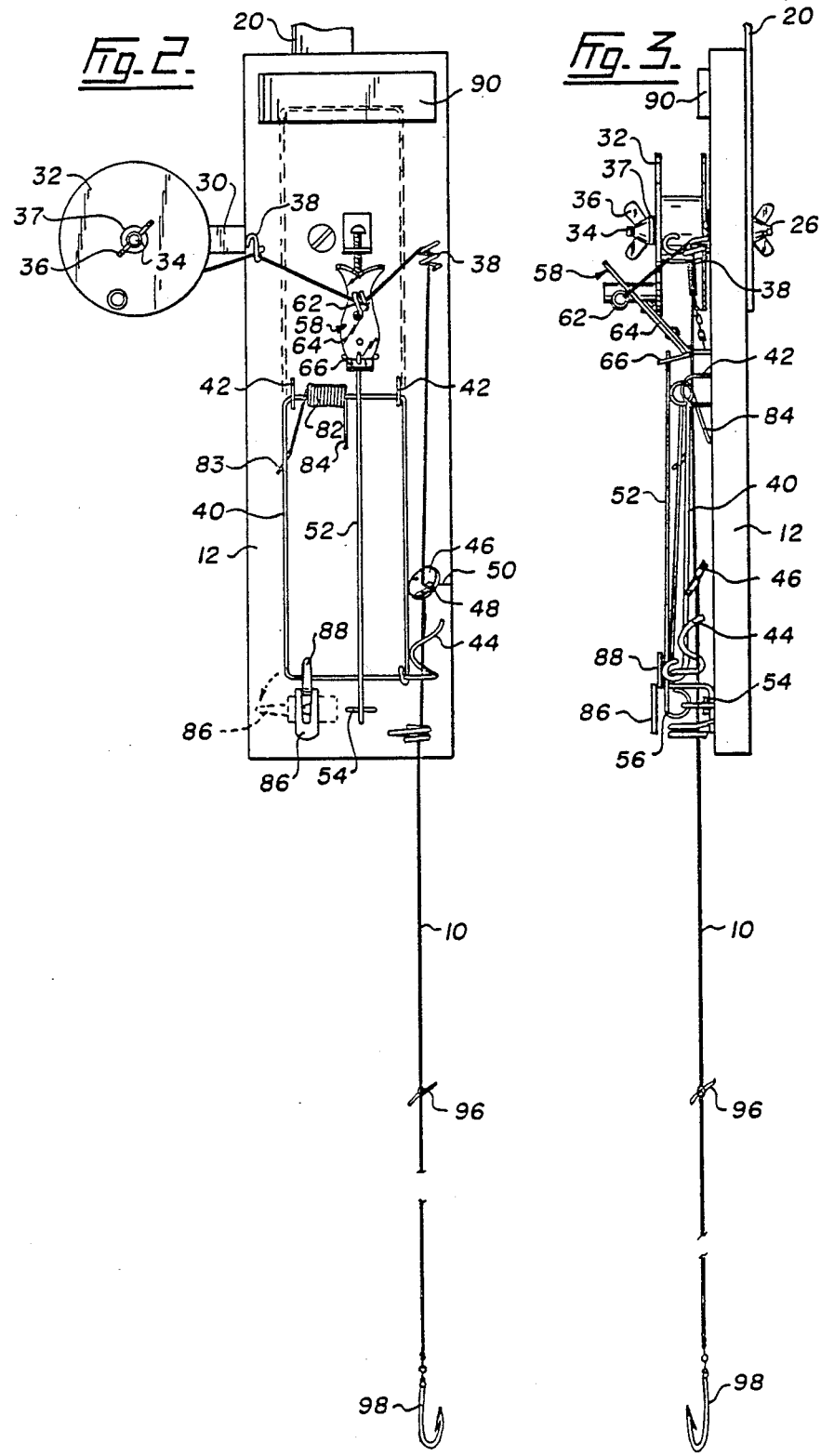

ICE FISHING APPARATUS WITH SELF HOOK SETTING MEANS

FIELD OF THE INVENTION

This invention relates to an apparatus to strike a fishing line. The invention finds particular application in ice fishing.

Striking a fishing line is the action whereby a fisherman, sensing a fish has engulfed the bait, moves the line rapidly upwardly to ensure that the hook is embedded in the mouth of the fish.

DESCRIPTION OF THE PRIOR ART

Ice fishing is a very popular sport in the northern United States and in many regions of Canada. In ice fishing a hole is drilled through the ice and fishing is then carried out in a normal manner.

There are two particular problems with ice fishing. First the approach of the fisherman over the ice disturbs the fish. It should be remembered that the fisherman is directly over the water so the fish can be alarmed by the approach of the fisherman, by the drilling of the hole and by the noise inevitable in the setting up of the fishing position. As a result the fish usually leave the area until calm is maintained, whereupon normal patterns of fish movement are reestablished. The second obvious problem is the cold. Obviously, cold is necessary if the ice is to be strong enough to support the fisherman but fishing in the cold can be uncomfortable, especially bearing in mind that for the first half hour or so the fisherman is fully aware that there are no fish in the area; his own approach and subsequent activity has warned the fish to leave the area.

A seemingly obvious solution to the above is simply to prop a fishing rod in an appropriate position with the line extending down into the hole in the ice. However, this is not the effective solution that it might appear. A fish does not normally take stationary bait easily. It engulfs the bait with its mouth and if it senses a hook present, it rapidly discharges the bait, and with it the hook, from its mouth. One of the skills of fishing is to determine when a fish has made the relatively light, initial contact with the bait, and to time the strike so that the fish is impaled on the hook. If the fisherman is not controlling the line, then the fish will in most instances detect the presence of the hook and will eject the bait from its mouth before the hook can be set.

Accordingly, the problem with fishing systems in which the fisherman is not present is the absence of a strike.

SUMMARY OF THE INVENTION

The present invention provides an apparatus that is able to strike a fishing line. The apparatus has a base. A spool for the fishing line may be mounted on the base and there are guides on the base for a fishing line. In particular the present invention includes means to impart rapid upward motion to the line, the so-called strike of fishing.

BRIEF DESCRIPTION OF THE DRAWINGS

The invention is illustrated, merely by way of example, in the accompanying drawings in which:

FIG. 1 is a general view in perspective, of an apparatus according to the present invention;

FIG. 2 is an enlarged view of the apparatus according to the present invention;

FIG. 3 is a side elevation of the apparatus of FIG. 2; and

FIGS. 4 and 5 are detail of FIG. 1.

The drawings show an apparatus to strike a fishing line 10. The apparatus comprises a base 12, that is suspended from a stand 14 comprising a flat triangular top piece 16 with three legs 18 extending downwardly outwardly in the manner of a tripod. The base 12 is attached to the stand by a bar 20 extending downwardly through an opening 22 in the top piece 16—see FIG. 4. The bar 20 is located to the top piece 16 by a bolt 24 and to the base 12 by a bolt and wing nut 26—see FIGS. 3 and 5.

An arm 30 extends outwardly from the base 12 and a spool 32, having a supply of fishing line 10 on it, is located on the arm 30. As indicated most clearly in FIG. 3 the spool 32 is mounted on a bolt 34 that receives a wing nut 36. A flexible washer 37 is inserted between the wing nut 36 and the face of the reel. The arrangement means that the ease with which the spool rotates can be controlled by tightening or loosening nut 36.

There are guides on the base 12 for the fishing line 10. As shown the guides comprise coils 38. Coils 38 ensure that the line 10 is guided properly, that is cannot leave the coils 38, but also ensure that the line 10 can be threaded through the coils 38 at a point intermediate the ends of the line 10, that is it is not necessary to lead the line 10 through the coils 38.

The apparatus includes means to impart a rapid upward motion to the line 10. As shown most clearly in FIG. 2 the means to impart a rapid upward motion comprises a frame 40 pivotably mounted on the base 12 by loops 42. At its lower right hand corner, as shown in FIG. 2, the frame 40 has a coil 44 to engage the line 10. This arrangement ensures that the line 10 is moved upwardly, when the frame 40 moves upwardly. To this end a small, flexible disk 46 is attached to the line 10 to provide the grip of the spiral 44 on the line 10, that is to ensure that the line 10 is moved rapidly upwardly and does not merely pass through the spiral 44 as the spiral moves upwardly with the frame. The disk 46 comprises a simple circular rubber disk with opposed diametric slits 48 so that the line may be attached to the disk. A line 50 is marked on base 12 to show where the disk 46 may be attached to line 10.

There are means to hold the frame 40 in a captive position. In the illustrated embodiment the means comprises a catch 52 extending from a pivotal mount comprising a loop 54, to which catch 52 is attached by a loop 56 at its lower end. Catch 52 extends upwardly, across the frame 40 so that it contacts the upper and lower edges of the frame 40 to a releasable anchor point. In the illustrated embodiment, the releasable anchor point is a trigger 58 formed with an opening 60 to engage the catch 52 to retain it across the frame 40 and thus to render the frame 40 captive.

The trigger includes a coil 62 through the line 10 passes. As shown probably most clearly in FIG. 5 the trigger 58 comprises a main body 64, including the coil 62, a first extension 66 and a second extension 68 at its lower end. The first extension 66 extends outwardly from the base 12 and is formed with the hole 60 that acts as the anchor point for the catch 52. The second member 68 extends rearwardly from 70. Loop 70 provides a pivotal anchor point for the trigger 58.

The apparatus desirably includes means to vary the force needed to release the trigger 58. In the illustrated embodiment the means to vary the force comprises a threaded member 72 extending downwardly from a threaded anchor point 74. The threaded member 74 is provided with a hole 76 to which is attached a swivel 78 which is in turn attached by a small coil spring 80 to the second member 68 of trigger 58. To render the trigger 58 more sensitive, threaded member 72 is screwed downwardly to move the second member 68 downwardly and thus the first member 68 upwardly. The loop 70 act as a fulcrum.

There are means to urge the frame 40 rapidly from the captive position once the frame 40 has been released by catch 52. In the illustrated embodiment that means comprises a coil spring 82 having a a first limb 83 extending to abut the underside of the frame 40 and a second limb 84 to abut the upper surface of the base 12.

The illustrated apparatus includes a safety catch 86 which holds the frame 40 in the captive position unaffected by the position of the trigger 58 and the catch 52. A simple pivotal U-bracket is shown. The safety position is shown in solid lines in FIG. 2. Pivoting the catch 86 so that its upstanding arm 88 cannot contact the frame 40 allows movement of the frame 40 under the influence of spring 82, once the trigger 58 and catch 52 are released.

The base 12 also desirably has a buffer 90 so that when the frame 40 moves upwardly, under the action of the spring 82 it contacts the buffer, which may be of rubber. This is simply to protect the base 12 from repeated poundings by the frame 40.

To use the equipment of the present invention a hole 90 is drilled in ice 94, as in the conventional ice fishing technique - see FIG. 1. In the illustrated embodiment the stand 14 is assembled, the bar 20 is pushed through the opening 22 and secured with bolt and wing nut 24. The base member 12 is attached to the bar 20 by the bolt and the wing nut 26. The same bolt and wing nut 26 is used to attach the arm 30 and the spool 32 is then placed on the arm 30. The wing nut 36 is tightened to the required extent to provide the appropriate resistance to rotation for the spool 32.

The line 10 is then wound from the spool 32 to the position shown in FIGS. 1, 2 and 3, that is so that it extends through coils 38 and downwardly from the base 12. A sinker is attached to the line 10. These operations are desirably carried either with the frame 12 released from the captive position or, preferably, with the frame 12 in the captive position but with the safety catch 86 on. The weighted line is then allowed to move downwardly to contact the bottom of the lake in which the fishing is being carried out. When the bottom is reached the line and sinker is lifted one to two feet and a marker, for example an elastic band 96, then tied around the line 10 as shown in FIGS. 2 and 3, at the water line. This is to ensure that the hook is always at the appropriate depth required by the fisherman.

The line 10 is now reeled in with the band 96 in place. A hook 98, bait and sinker are attached. The weight is just sufficient to ensure that the line 10 is kept taut once fishing depth is reached. The baited and weighted line 10 is then allowed to drop into the water until the marker 96 contacts the water. The drag on the spool 32 may now be set by rotating nut 36 and disk 46 is attached to the line 10 by winding the line tightly a number of times around the disk 46 in the diametric cuts 48 at line 50 on base 12.

The catch 52 is extended across the frame to engage the opening 60 in the trigger 58. The trigger 58 is set, by moving the threaded member 72 to the appropriate sensitivity. A hair trigger, that is a highly sensitive position, is generally preferred.

The equipment may be then tested. After ascertaining that safety catch 86 is on, that is in the solid line position shown in FIG. 2, the line 10 may be pulled to ensure that the trigger 58 is released from the catch member 52 as, under the normal conditions—that is with the safety catch 86 off, this would ensure proper operation of the apparatus. The safety catch 86 is released, that is turned to the broken line position of FIG. 2, and the apparatus may be then left.

When a fish makes slight contact with the baited hook, the apparatus duplicates the action of a skilled fisherman. That is, the line 10 tends to move the trigger member 58 back towards the base 12. As a result, the catch 52 is released from opening 60 in member 66 and the frame 40 moves rapidly upwardly under the influence of spring 82. As a result the line 10 is jerked upwardly by spiral 44 engaging the line, assisted by the presence of the disk 46. The fish is then firmly hooked. The line is released from spiral 44 which is dimensioned to facilitate release of the line when the frame 40 is raised and there is a load on the line 10. Control of the line is then achieved by the preset tension of spool 32.

The apparatus of the present invention should be made of durable materials, able to resist low temperature. The base may be made of wood and the coils, frame and catch member may desirably be made of a corrosion resistant metal, for example galvanized steel.

I claim:

1. An apparatus to strike a fishing line comprising:
   a base;
   means to mount a reel for fishing line on the base;
   guides on the base for a fishing line; and
   means to impart a rapid upward motion to the line, said means comprising a frame, pivotally mounted on the base at an upper edge of the frame and pivotable from a captive to a free position;
   a spiral at a lower edge of the frame to engage a fishing line so that, as the frame moves from the captive to the free position, the line is moved upwardly;
   a catch to hold the frame in a captive position, the catch extending from a pivotal mount for the catch, across the frame to a trigger pivotally mounted on the base, adjacent an upper edge of the frame, and having an opening to engage the catch;
   means to attach fishing line to the trigger whereby a pull on the line pivots the trigger to release the catch to release the frame to strike the line; and
   means to vary the force needed to release the trigger comprising a threaded member extending downwardly to attach to the trigger at a point on the opposite side of the pivotal mount from the catch, whereby extension and retraction of the threaded member moves the trigger relative to the catch.

2. An apparatus as claimed in claim 1 including a stand;
   means suspending the base from the stand.

3. An apparatus as claimed in claim 2 in which the stand is a tripod.

4. An apparatus as claimed in claim 1 in which the means to mount the reel comprises an arm extending outwardly from the base.

5. An apparatus as claimed in claim 1 in which the guides comprise coils through which the line can be threaded.

6. An apparatus as claimed in claim 1 including a safety catch to hold the frame in a captive position unaffected by the trigger and catch positions.

7. An apparatus to strike a fishing line comprising:

a base;

means to mount a reel for a fishing line on the base;

guides on the base for a fishing line;

a frame, pivotally mounted on the base at an upper edge of the frame and pivotable from a captive to a free position;

a spiral at a lower edge of the frame to engage a fishing line so that, as the frame moves from the captive to the free position, the line is moved upwardly;

means to hold the frame in a captive position;

means to release the frame from a captive position;

means to urge the frame rapidly from the captive position once released;

a reel mounted on the base;

a line extending from the reel through the guides on the base and through the spiral at the lower edge of the frame;

a flexible body on the line, above the spiral to facilitate gripping of the spiral on the line as the frame is urged rapidly from the captive position.

8. An apparatus as claimed in claim 7 in which the flexible body on the line is a flexible disc removably mounted on the line.

* * * * *